Figure 1:
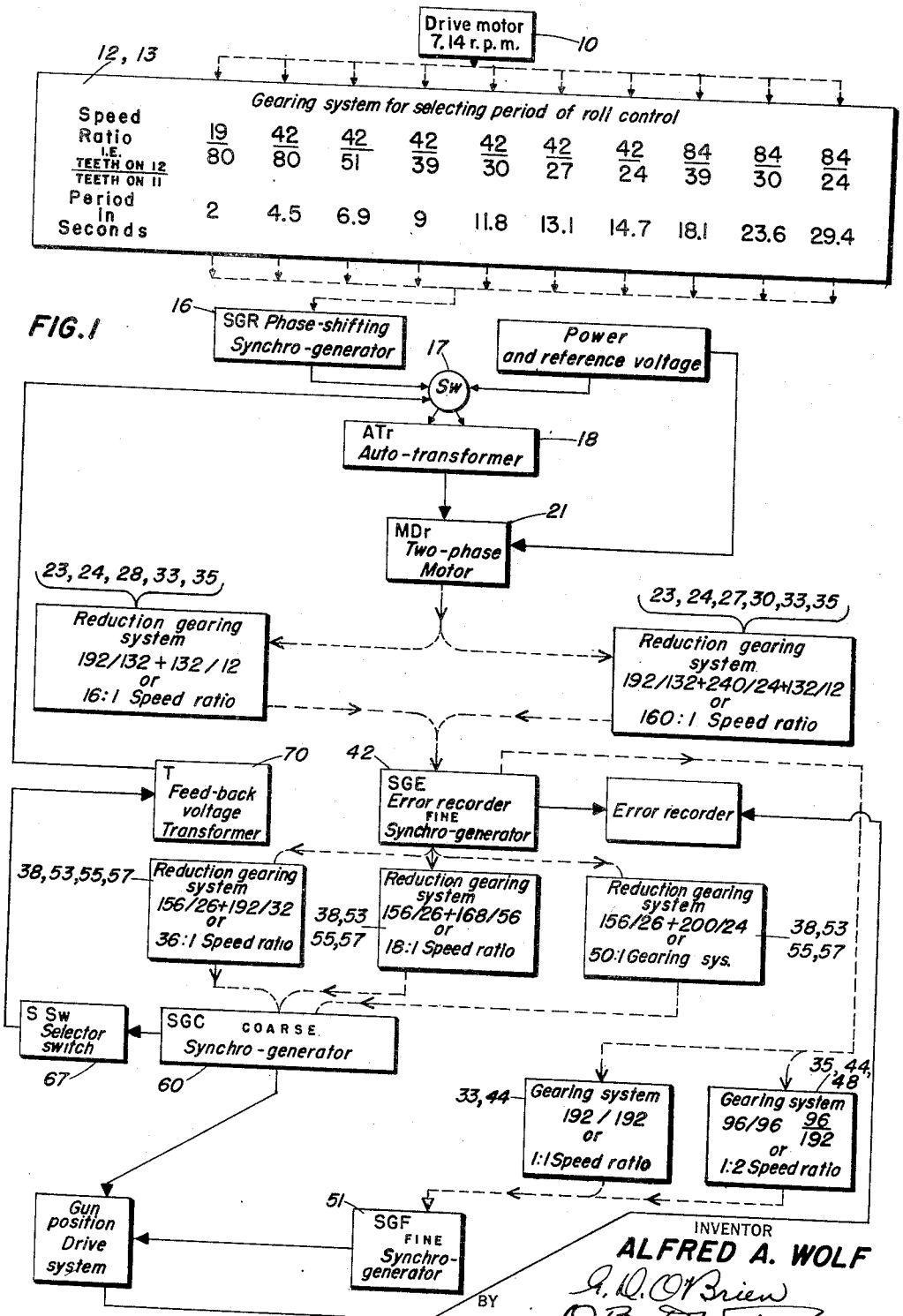

Jan. 26, 1954

A. A. WOLF 2,667,609

MOTION GENERATOR FOR TESTING SERVO MECHANISMS

Filed Nov. 28, 1945

4 Sheets-Sheet 1

INVENTOR
ALFRED A. WOLF

INVENTOR
ALFRED A. WOLF

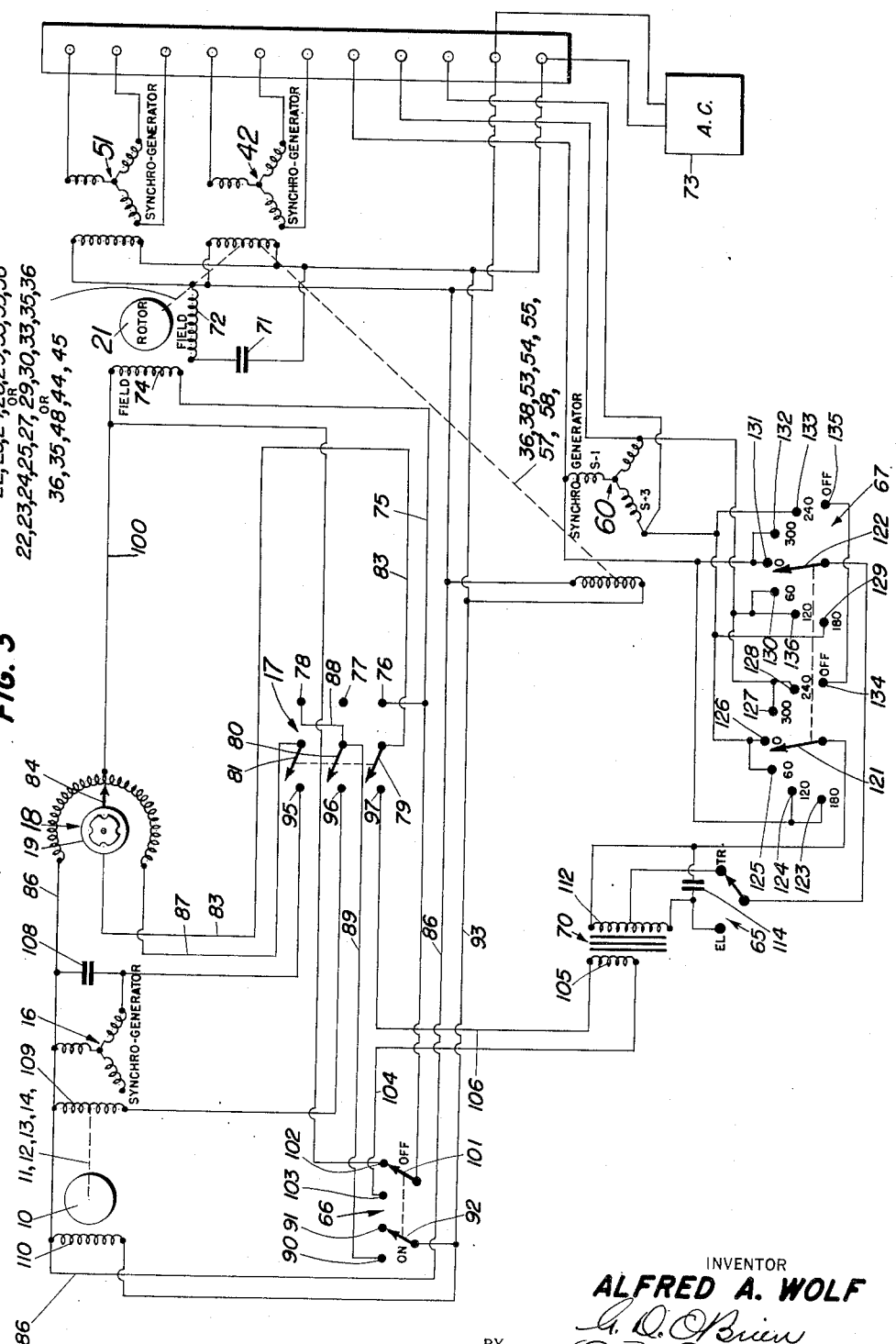

Jan. 26, 1954           A. A. WOLF           2,667,609
MOTION GENERATOR FOR TESTING SERVO MECHANISMS
Filed Nov. 28, 1945                       4 Sheets-Sheet 4
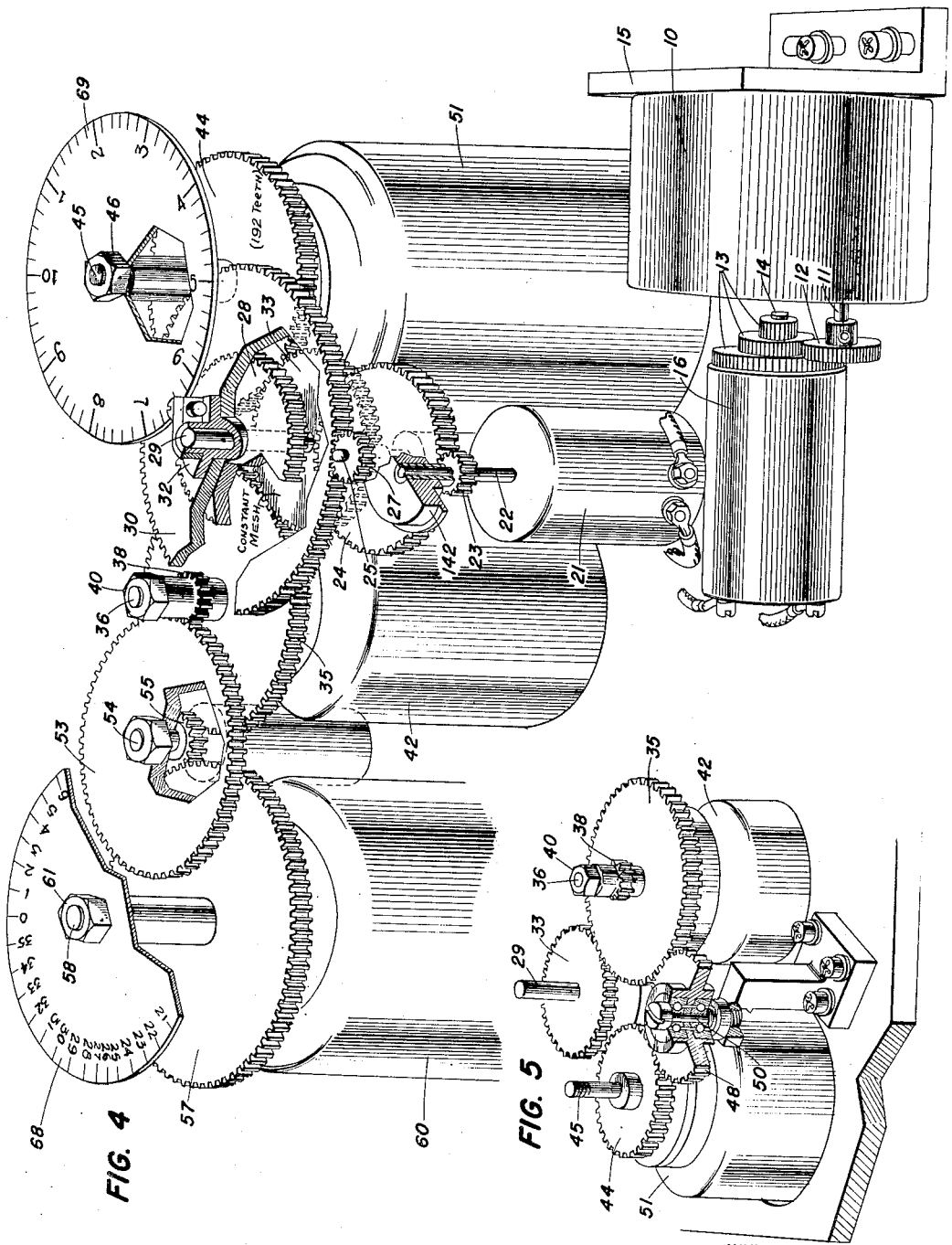
INVENTOR
ALFRED A. WOLF
BY
ATTORNEYS Patented Jan. 26, 1954

2,667,609

UNITED STATES PATENT OFFICE 2,667,609

MOTION GENERATOR FOR TESTING SERVO MECHANISMS

Alfred A. Wolf, Dallastown, Pa., assignor to the United States of America as represented by the Secretary of the Navy Application November 28, 1945, Serial No. 631,451

8 Claims. (Cl. 318—30)

The present invention relates to motion generators of the type included in remote control systems, and, while it has a considerable range of prospective application, it relates particularly to such generators of the dummy-director type employed for introducing angular motion electrically into the elevation or training drives included in a gun-mount remote control system under test.

The prior art reveals methods and appliances for providing a static accuracy test of the fidelity of a gun laying system in departing from an initial position of rest in response to electrical order signals transmitted from a director. However, since a test of this character does not continuously indicate the lagging error between order and gun response when the system units are in motion, dummy director-error recorder systems were developed in order to provide a means for conducting dynamic accuracy tests and recording the results thereof. The error recorder is a prior-art device for indicating and recording continuously the instantaneous differences between electrical gun order signals and gun positions in train or in elevation. In order to simulate fire control conditions existing aboard ship, where a gun mounted on a rolling and pitching deck must be laid along a moving line of fire to a moving target, such director-recorder systems include means whereby electrical order signals corresponding either to constant velocity or simple harmonic motion of the gun are transmitted from the dummy director to the remote control driving equipment of the gun mount and also to the error recorder. The error recorder also receives signals from an electrical generator driven by the driving equipment in responding to the order. As the gun moves in accordance with the changing signal, the error recorder compares order and response and makes a permanent record of the instantaneous difference therebetween.

In accordance with one such prior-art arrangement a dummy director comprises a constant-speed power motor, a ball-type integrator driven by the motor and having an output shaft which either rotates with constant velocity or generates simple harmonic motion of rotation, i. e., motion of a shaft particle whose angular displacement from a central position varies sinusoidally with time, as determined by the integrator setting. This output shaft is geared to the rotors of a synchro generator system included in the director. Rotor winding motion induces in the generator stator windings currents which are applied to the stators of a synchro control transformer system included in the gun driving system to cause the stator fields to rotate either with constant velocity or sinusoidally, as the case may be. The gun driving system includes electrical and mechanical components which cause the gun to be laid in accordance with the movements of the last-mentioned stator fields. This arrangement is subject to a serious limitation for the reason that the "central" position about which harmonic motion occurs is subject to drift and is not fixed or predetermined, so that gun oscillation about a selected reference point is not obtained. This undesired result follows from the fact that when the mechanical input to the integrator ceases, the output rollers and synchro generator rotors stop at some random point determined by their inertia and the friction of the system, thereby causing the "central" position of the synchro generators to shift. The ultimate result is that when the simple harmonic motion test is resumed the gun oscillates about a different reference point than that about which the motion occured prior to the cessation of the mechanical input. The situation presented is analagous to that which would apply to a steel ball actuated to move back and forth with simple harmonic motion across a flat table by some mechanical means not secured to the ball. In the absence of springs or of some elastic means tending to make the ball seek a central reference point, upon the removal of mechanical force therefrom it would stop at whatever random point inertia and friction dictated.

In accordance with other prior-art systems velocity is introduced by a small motor and in the function of simple harmonic motion acceleration is introduced by a bell crank or scotch yoke. Such systems require fine machining and are also subject to reference point drift in the roll test. I have found that by novel means involving the substitution of an electrical roll-signal generator and a two-phase reversible induction motor for the conventional motor and ball integrator or the like, the derivation from one of the output synchro generators of a feedback voltage having a magnitude dependent upon the deviation of the synchro generator rotor from a pre-selected reference position and the application of both the output voltage of the roll-signal generator and the feedback voltage of said output synchro generator to an input winding of the two-phase motor, a new and improved motion generator and dummy director which avoids the above-mentioned disadvantage of prior-art arrangements can be provided. I have also found that by the provision of a switching system coupled to the last-mentioned synchro generator the reference point can be made to shift at the will of the operator to any one of a plurality of preselected points, so that the gun driving equipment can be tested for dynamic accuracy of response to ordered simple harmonic motion about any selected one of a corresponding plurality of true reference points not subject to drift.

Accordingly, it is an object of the present invention to provide an improved motion generator for generating electrical order signals, corresponding either to constant velocity or simple harmonic motion of the remote control gun positioning system under test, the last mentioned motion being about a predetermined reference point which can be shifted at the volition of the operator.

Another object of the invention is to provide such a motion generator which is simple and economical in construction and involves relatively few and well-known components.

A further object of the invention is to provide a dummy director incorporating improved means for controlling the magnitude of the motion of the gun in the constant velocity test and the amplitude of its motion in the roll test.

Figure 2:
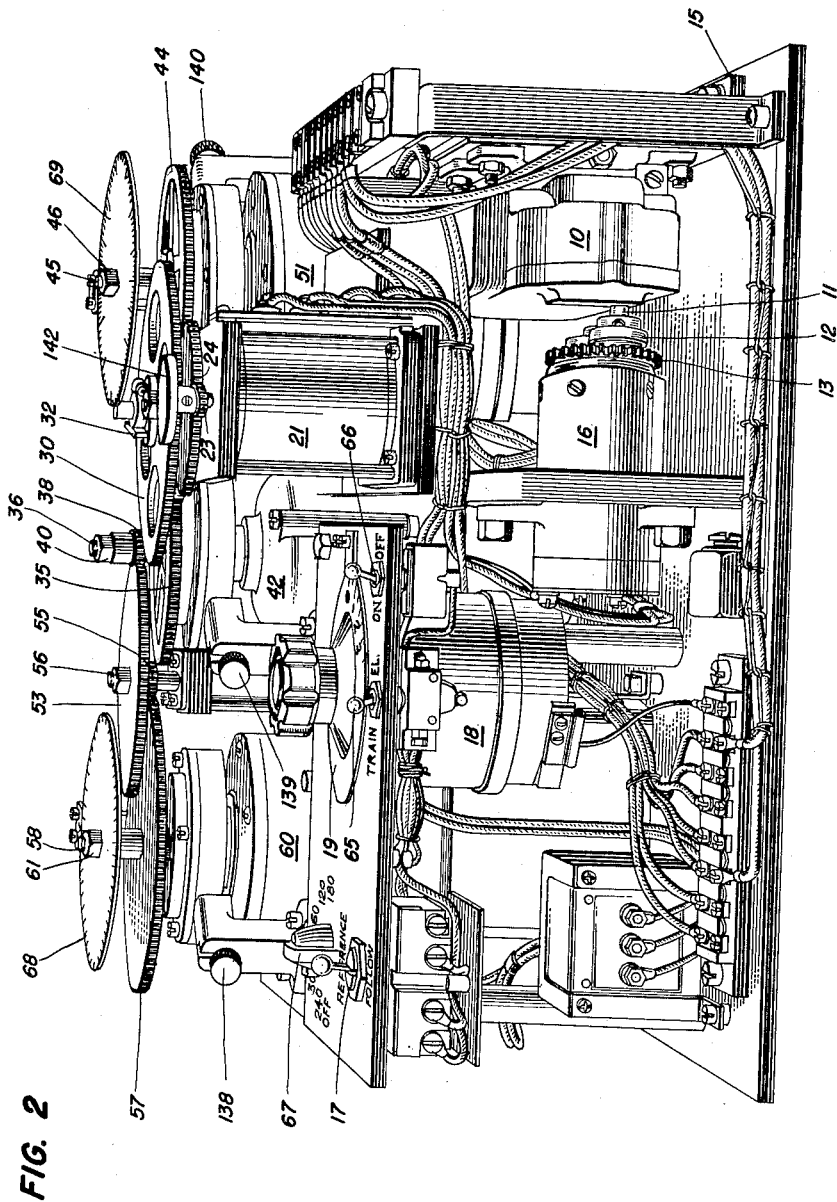

For a better understanding of the present invention, together with other and further objects thereof, reference is made to the following description taken in connection with the accompanying drawings, and its scope will be pointed out in the appended claims. Referring now to the drawings: Fig. 1 comprises a block diagram of a dummy director incorporated in a gun position remote control system, and embodying a preferred form of motion generator in accordance with the present invention; Fig. 2 is a perspective view of the director, as seen from the front; Fig. 3 is a circuit schematic of the director electrical components, showing their relationship to the mechanical elements; Fig. 4 is a fractional perspective view of the director showing the detailed arrangement of the gearing and other mechanical components, parts being broken away; and Fig. 5 is a detail schematic outline of a portion of the director mechanisms, illustrating the gear settings for 1:2 operation.

Referring now specifically to Fig. 1 of the drawings, the dummy director and the associated error recorder and gun drive system comprise the principal units illustrated in block form. Those units which are included in the dummy director have the reference numerals assigned hereinafter in the detailed description thereof. The dummy director essentially comprises the following:

(1) A low speed or coarse synchro generator SGC and a high speed or fine synchro generator SGF for transmitting electrical signals from the director to the input circuits of a gun training or elevation driving system, in order to lay or move the gun in elevation or train either with constant velocity or with simple harmonic motion, as desired;

(2) A high speed or fine error recorder synchro generator SGE for transmitting fine electrical order signals to an error recorder for comparison of the order signals and response signals generated at the gun mount and also applied to the recorder in order to record the fidelity of the gun in responding to the electrical orders;

(3) A two-phase low-inertia type induction motor MDr for driving the rotors of the synchro generators, thereby to cause gun order signals to be induced in the stator windings of the latter;

(4) A variable auto-transformer ATr adapted to be connected to a power and reference voltage supply source or to a roll-signal generator for stepping down the magnitude of the rotation-direction-determining voltage before it is applied to a winding of the induction motor;

(5) Roll generating means including a synchro generator SGR having a rotor winding adapted to be rotated by a constant-speed motor and having stator windings connected to the auto-transformer to periodically reverse the phase and sinusoidally vary the amplitude of the voltage fed to one of the field coils of the induction motor through the auto-transformer, thereby to cause the aforementioned two-phase induction motor periodically to reverse its direction of rotation, while its power output, and resultant speed under a given load, vary sinusoidally between such reversals;

(6) A switch Sw for coupling the auto-transformer either directly to the power and reference voltage supply or to the roll-signal generator when the gun is under test for constant velocity or simple harmonic motion, respectively;

(7) A feedback voltage generating circuit comprising one of the coarse synchro generator stator windings and a voltage transformer T coupled to one of the two-phase motor windings for applying such a voltage to the winding as to stabilize the reference point about which simple harmonic motion occurs;

(8) A selector switch SSw included in the feedback voltage circuit for selecting any one of a plurality of harmonic motion reference points sixty (60) mechanical degrees apart;

(9) A system of variable gearing between the aforementioned constant speed motor and the roll-signal generating means for selecting the period of the controlled roll;

(10) A system of reduction gearing between the two-phase motor and the error recorder synchro generator providing speed ratios of 16:1 and 160:1, as desired;

(11) A system of reduction gearing between the error recorder synchro generator and the coarse output synchro generator to provide speed ratios of 36:1 and 18:1;

(12) A system of gearing between the error recorder synchro generator and the fine output synchro generator to provide speed ratios of 1:1 and 1:2, as desired.

Having now described the principal units and functions of the dummy director, I now make reference to Figs. 2, 4 and 5 for a further description of the mechanical components included therein. The constant-speed electrical motor 10 adapted for rotor rotation of 7.14 R. P. M. serves as the prime mover of the simple harmonic motion signal system. The motor is coupled through a shaft 11, gear 12, gear 13, and shaft 14 (Fig. 4) to the rotor of the roll-signal generating synchro generator 16. The period of the roll or simple harmonic motion control may be made to vary through the following steps: 2, 4.5, 6.9, 9, 11.8, 13.1, 14.7, 18.1, 23.6, and 29.4 seconds, approximately, by the use of an appropriate one of six gears having 80, 51, 39, 30, 27, and 24 teeth as gear 12 and an appropriate one of the three illustrated gear sections having 19, 42, or 84 teeth as gear 13. The motor is mounted on an adjustable bracket 15, so that gear 12 may be changed and brought into position to drive the selected one of gears 13. Generator 16 has two serially-connected stator windings connected through the three-pole double-throw switch 17 to the variable auto-transformer 18 of the Variac type. Secured to the movable contact arm 84 (Fig. 3) of the transformer is the control dial 19, the setting of which is determinative of the velocity of follow or the amplitude of roll, as desired. The Variac output is coupled to the two-phase motor 21. Generator 16 functions to determine the behavior of motor 21 when the test is for simple harmonic motion. When the test is for constant velocity, the Variac is coupled directly to the power supply circuit.

The dummy director includes the above-mentioned speed reduction gearing system of 16:1 or 160:1 ratio from the two-phase motor to the error recorder synchro generator 42. The motor rotor shaft 22 is geared for 16:1 reduction to the synchro generator 42 through gear 23 on shaft 22, gear 24 on shaft 25, gear 28 on shaft 29, gear 33 on shaft 29, and gear 35 to the shaft 36 of the error recorder synchro generator 42. For 160:1 reduction, as shown in Fig. 4, the motion is transmitted through elements 22, 23, 24, 25, gear 27 on shaft 25, gear 30 on shaft 29, and elements 33, 35, and 36. Suitable numbers of teeth for gears 23, 24, 27, 28, 30, 33, and 35 are 12, 132, 24, 132, 240, 132 and 192, respectively. Fitted to shaft 29 is a gear-lifting means 32 for bringing gear 30 into contact with gear 27 for the 160:1 speed, and for disengaging gears 28 and 24.

The director also includes a 1:2 or 1:1 gearing system between the error recorder generator 42 and the fine output synchro generator 51. For 1:1 speed, motion is transmitted from the two-phase motor rotor to gear 33, which is in contact with gear 35. Since gear 35 has the same number of teeth as gear 44 on shaft 45 and driven by gear 33, gear 44 rotates at the same rate of speed as gear 35 and is effectively coupled thereto or driven thereby, even though gear 44 is actually driven by gear 33. The motion, as indicated in Figs. 2 and 4, then, is effectively transmitted through elements 36, 35, 33, 44 to the shaft 45 of fine synchro generator 51. For the speed ratio of 1:2 the motion is translated through elements 36 and 35 to an idler gear 48 on shaft 50 (Fig. 5) and thence to a gear 44 fitted on shaft 45. Gear 44 may be provided with 96 teeth for 1:2 operation and an additional interchangeable gear 44 having 192 teeth is provided for 1:1 operation. In 1:2 operation gear 33 does not touch gear 44. Nut 46 on shaft 45 permits changing of gear and dials. It will be noted that idler gear 48 (Fig. 5), which preferably has 96 teeth, is not used on 1:1 operation (Fig. 4) and that for that condition gear 44 is actually driven by gear 33, while for the 1:2 condition of operation gear 44 is driven by gear 35 through idler gear 48 (Fig. 5). Gear 33 always drives gear 35.

The dummy director also includes the above described gearing system for providing speed ratios of 36:1, 18:1, or 50:1 for train, elevation, and fuze setting tests, between recorder generator 42 and the coarse output synchro generator 60. For either of these conditions, motion is translated through shaft 36, gear 38, gears 53 and 55 on shaft 54, and gear 57 to the shaft 58 of the rotor of coarse synchro generator 60. Three individual gears 38 having numbers of teeth equal to 24, 32, and 56 are provided for the ratios of 50:1, 36:1, and 18:1, respectively. Similarly, three individual gears 53, having numbers of teeth equal to 192, 168, and 200 are provided for the settings of 36:1, 18:1, and 50:1 respectively. Gear 55 preferably has 26 teeth. Appropriate means 32, 40, 46, 56 and 61 are provided to facilitate changes of gears and dials and proper gear contacts. It will be noted that the above described gearing system is effective to couple the fine generator 51 to the coarse generator 60 at speed ratios of either 72:1 or 36:1 for train tests, at a ratio of 36:2 or 18:1 for elevation tests, and at a ratio of 50:1 or 100:2 for a fuze setting test.

Referring again to Fig. 1, it will be noted that the blocks representing the gearing systems are assigned reference numerals including the number of the gears just described and that the blocks include developments of the speed ratios premised on the suggested numbers of teeth. These numbers are design parameters and are submitted by way of description and not of limitation.

Among the accessory devices illustrated in Fig. 2 are a train-elevation switch 65, and on-off switch 66, a reference selector switch 67, and dials 68, 69 mounted on the shafts of the coarse synchro 60 and the fine synchro 51, respectively, for indicating director position angles. The purposes and operation of the accessories will be made apparent in the following description of the operation of the director. All of Fig. 2 mechanical components may be placed as a unitary assembly in a portable case.

Referring now specifically to Fig. 3 of the drawings for a further description of the circuits, there are shown in symbolic form synchro generators 42, 51, and 60, motor 21 and the gearing systems described above. The rotor windings of the synchro generators 42, 51, 60 and field winding 72 of motor 21 are energized by reason of their direct connections to a 115 volt 60 cycle alternating current power and reference voltage supply 73. Phase-splitting capacitor 71 is serially included in circuit with winding 72 in order to phase-displace the voltage applied thereto with reference to the voltage applied to the other motor field winding 74. The direction of rotation of the rotor of motor 21 is determined by the relative time phases of the voltages applied to windings 72 and 74. The motor is made to reverse by reversing the phase of the voltage in winding 74. The speed of rotation of the rotor of motor 21 is regulated by varying the amplitude of the voltage applied to winding 74. When switch 17 is set for a constant velocity test, winding 74 is energized from the output circuit of Variac 18 through the associated connections comprising conductors 75 and 100, contact 76 of switch 17, switch-arm 79, conductor 83, and Variac adjustable contact arm 84. For this test the primary or input circuit of the Variac is coupled to the power supply 73 by conductor 86, conductor 87, contact arm 81 and contact 78 of switch 17, conductor 88, conductor 89, contact 90 and arm 92 of switch 66, and conductor 93.

The operation of the circuit elements just described and adapted to energize the synchros during the constant velocity tests is apparent from the foregoing description. The magnitude and phase of the voltage applied to winding 74 and therefore the velocity and direction of rotation of motor 21 and of movement of the gun are determined by the degree and direction of displacement of Variac contact arm 84 from the zero position shown. The proper settings of arm 84 for desired velocity are empirically determined and dial 19 is calibrated accordingly, so that the velocity of the gun movement in degrees per second may be indicated to the dummy director operator. Interchangeable dials 68 and 69 are similarly provided, for indicating director position and fuze setting at the 72:1, 36:1 and 50:1 speeds.

In order to provide means for causing the output synchro to generate simple harmonic motion signals, switch 17 is adapted to be thrown into contact with contacts 95, 96, and 97. Under this assumed condition, winding 74 is not energized by direct connection with the Variac alone but is coupled to the Variac and a portion of the feedback voltage means presently to be described. Specifically, winding 74 is coupled to the Variac output circuit through conductor 100, conductor 75, arm 101 and contact 103 of switch 66, conductor 104, secondary 105 of transformer 70, conductor 106, contact 97 and arm 79 of switch 17 and conductor 83. It will be noted that the setting of switch 17 under this assumed condition is effective to insert secondary 105 in the last-mentioned circuit. Similarly the primary of the Variac is not then energized by direct connection to the power supply. The input circuit of the Variac is coupled to the two serially-connected stator windings of the roll generator 16 through arm 81 and contact 95 of switch 17. A synchro capacitor 108 is shunted across the last-mentioned stator winding for the purpose of power-factor correction. The magnitude of the voltage applied to winding 74 of motor 21 is caused to vary sinusoidally and the phase of that voltage is periodically reversed by continuous rotation of the rotor 109 (winding only shown) included in generator 16. The carrier signal in the rotor of generator 16 is a signal of 60 cycles frequency. The output signal in its stator is a modulated signal having a carrier frequency of 60 cycles and an envelope which varies sinusoidally. That is, with respect to the signal in winding 72 of motor 21, the phase of the output signal of generator 16 periodically leads by approximately 90° or lags by approximately 90°, and its envelope varies sinusoidally according to the frequency of rotation of the rotor of generator 16. Winding 109 is energized by connection through conductor 86, contact 96 and arm 80 of switch 17, conductor 89, contact 90 and arm 92 of switch 66, and conductor 93 to the power supply. Rotor 109 is rotated by the rotation of the rotor of motor 10 and the above-described gearing elements 11 to 14, inclusive. Motor 10 includes a winding 110 energized by the same supply source 73.

Neglecting for the moment the operation of transformer 70 and the associated feedback circuit from synchro generator 60 to winding 74, it will be apparent that the above-described circuits provided for the simple harmonic motion tests are effective to produce a periodically reversing operation of the rotor of motor 21 and corresponding periodic reversals of the rotation of the rotors of the synchro generators 51 and 60, which phenomena cause to be induced in the stator windings electrical signals translated to a gun elevation or train drive mechanism to cause oscillatory motion of the gun. According to one feature of my invention, the electrical roll generating means and two-phase motor have been provided for the purpose of producing signals which cause this oscillatory motion. However, upon stopping of motor 10, the gun mount normally tends to continue moving at a constant velocity. This is apparent from a consideration of Fig. 3 wherein the stator of synchro generator 16 continues to produce a fixed envelope alternating current signal whose magnitude is proportional to the sine of angular displacement between the stationary rotor and stator of synchro 16, which signal is applied to motor field coil 74.

According to another feature of my invention I provide electrical means which causes the conditions of true simple harmonic motion of rotation fully to be satisfied. In accordance with this feature, a plurality of feedback voltage paths are provided from each of the six Y-connected phases of generator 60 (each set of two stator windings being regarded as two phases, because of the two opposed positions of the rotor with respect to each two coils) through corresponding pairs of contacts 126—131, 125—130, 124—135, 123—129, 128—133 or 127—132 and ganged contact arms 121 and 122 of switch 67, to primary 112 of transformer 70. Across the primary of the transformer a power-factor correcting capacitor 114 is provided. The step-down voltage ratio for the elevation test, during which the speed ratio between synchro generator 51 and synchro generator 60 is 36:2 is preferably 18:1. The corresponding ratio for the train test during which the synchro generator ratios may be either 36:1 or 72:1 is 9:1. The change of step-down ratio is made by movement of the contact arm of switch 65.

Coming now to a description of the operation of the means just described, it will be assumed that when the rotor of generator 60 is in the position indicated no voltage is induced in the phase including windings S-1 and S-3 and that the arms of switch 67 are on the zero contacts 126 and 131. It will also be assumed that at the time of the starting of motor 10 the gun position is in correspondence with the director position. When operation starts motor 10 rotates rotor 109; a sinusoidal signal is generated by generator 16 and translated to winding 74 through Variac 18; the phase of the voltage applied to winding 74 is periodically reversed and therefore motor 21 rotates in one direction and then in the other in accordance with a sine law; this motion causes the rotors of the synchro generators 51, 42, and 60 to oscillate, electrical signals are induced in the synchro generator stators and these signals are translated to the drive equipment to cause the gun to move with simple harmonic motion. As the rotor of generator 60 moves, it induces in the stator windings thereof a voltage which is applied from the phase S1—S3 through the contacts 126, 131 (marked "0—0") of switch 67 and transformer 70 to winding 74 in series opposition to the Variac output voltage causing rotation of the rotor of motor 21. The opposition voltage is substantially proportional to the displacement of the rotor of motor 21 from the reference position at which it was when the operation started. When motor 10 is now stopped the opposition voltage causes motor 21 to continue rotation until it reaches a position wherein the opposition voltage equals that generated by the stator of synchro 16 and then stop. If the rotor overshoots this position, the opposition voltage is applied to winding 74 in the opposite direction, again tending to return the rotor to the reference position. The result is that the rotor of motor 21 oscillates with true simple harmonic motion while motor 10 is operating. However, when motor 10 is stopped, motor 21 is stopped at a position having a fixed relation to the rotor position of motor 10. As the system may be manually adjusted for each operation, the rotor of motor 21 then oscillates about a preselected reference point. Similarly, if the contacts 125—130 marked "60—60" are selected by the reference selector switch, the gun mount is caused to move with true simple harmonic motion about a different preselected reference position. In like manner, a plurality of reference positions 60 mechanical degrees apart may be selected.

Returning now to the analogy developed in the introductory matter in this specification, it will be seen that the feedback voltage circuits function as the necessary elastic element in the mechanism to return the gun to the reference position, in like manner to the springs connected to the moving ball.

The period of the roll control is determined by the choice of gears 12 and 13. The amplitude of the roll control is determined by the position of contact arm 84 of Variac 18. Since it is well known that $$\text{Velocity} = \frac{2\pi \text{ Amplitude}}{T}$$

and that $$\text{acceleration} = \left(\frac{2\pi}{T}\right)^2 \text{amplitude}$$

where T is the period in seconds, amplitude is in degrees, velocity in degrees per second and acceleration in degrees per second per second, dial 19 may be calibrated in such manner as to permit the operator to obtain any desired amplitude within the operating range and the remaining quantities may be obtained from available nomographs.

Smooth action may be obtained and sudden accelerations may be prevented by providing a fly wheel 142 on shaft 22. Locking pins 138, 139, 140 permit setting of the synchro rotors on electrical zero.

While there has been described what is at present considered to be the preferred embodiment of the invention, it will be obvious to those skilled in the art that various changes and modifications may be made therein without departing from the invention, and it is therefore aimed in the appended claims to cover all such changes and modifications as fall within the true spirit and scope of the invention.

I claim:

1. In a remote control mechanism of the type including at least one output signal generator having a rotor and plurality of Y-connected stator windings angularly displaced from each other, a motor having a rotation-direction-determining circuit for driving the rotor of at least said one generator, a feedback circuit for coupling a selected one of the stator phases comprising two of said windings to said determining circuit for applying to the latter a voltage of such polarity and phase as to oppose rotation of said motor by an amount proportional to the magnitude of the angle generated by rotation from a reference position, thereby to refer motor rotation to a reference position, and switching means included in said feedback circuit for selecting any one of said phases, thereby to select any one of a like plurality of reference positions similarly angularly displaced from one another.

2. A dummy director for impressing a simulated simple harmonic motion order signal on a gun drive mechanism, comprising a prime mover, an electrical generator driven by the prime mover to produce a sinusoidal signal, a two-phase motor having a field winding, an auto transformer translating said signal to said field winding to cause periodic reversals of rotation of the respective rotor thereof, at least one synchro generator driven by said motor, said generator having a stator provided with a polyphase winding and having a rotor which is oscillated in agreement with said periodic reversals to induce in said stator an electrical signal transmissible to said gun drive mechanism, a transformer, means for coupling the transformer primary winding to selected one of said phase windings, the transformer secondary winding being coupled to the field winding of said motor in series with the output of said auto transformer to impress on said field winding a voltage in opposition to the auto transformer output whereby the reference position about which said motor oscillates may be selectively varied.

3. A dummy director for impressing simulated order signals on a gun drive mechanism, comprising a source of alternating current, a prime mover driven by current from said source, an electrical generator driven by the prime mover and having serially connected stator windings, an auto transformer, a two-phase motor of which one field winding is energized by current from said source, a synchro generator driven by said motor and having a stator winding in which is inducible an electrical signal transmissible to said mechanism, a transformer including a primary winding coupled with said stator winding and a secondary winding providing a source of feedback voltage, two circuits for energizing the second field winding of said motor, one of said circuits including the electrical generator having its output connected to the input of the auto transformer and the feedback transformer secondary connected serially with the auto transformer secondary and the second of said field windings, and the other of said circuits including the auto transformer having its input directly connected to said current source and its output directly connected with said second field winding, and a switch optionally operable to respectively complete said one circuit to impress on said second field winding a confluence of current derived from said transformer secondary and the output of the electrical generator thereby to produce periodic reversals of said two-phase motor and a consequent periodic reversal of the synchro generator rotor for concomitant excitations of its stator and resulting oscillation of the gun drive mechanism, or to close the other circuit thereby to exclude said transformer secondary and said electrical generator, said closure coupling the auto transformer directly to said current source and the output of said auto transformer to the second field winding to provide for constant velocity motion of said gun drive mechanism.

4. A dummy director for generating a simulated simple harmonic order signal to be impressed on a gun drive mechanism comprising a source of sinusoidally varying voltage, a motor having a rotation-direction-determining input circuit coupled to said source, a synchro generator driven by said motor, and means for applying a selected one of the generator phase voltages to said determining circuit in series with and in opposition to said voltage source.

5. A dummy director for generating a simulated order signal to be impressed on a gun drive mechanism comprising an alternating voltage supply, a source of sinusoidally varying voltage, a motor having a rotation-direction-determining input circuit, synchro generator driven by said motor and having an output circuit, means for selectively coupling said determining circuit directly to said supply whereby to generate a constant velocity signal or to said source in series with the output circuit of said generator whereby to generate a simple harmonic order signal, and means for coupling a selected one of the phase voltages of said generator to said output circuit in opposition to said voltage source.

6. A dummy director comprising a reversible motor having a rotation-direction-determining circuit, voltage-control means having input and output circuits, said voltage control output circuit being adapted to be coupled to said rotation-direction-determining circuit for regulating the direction and velocity of rotation of said motor, an adjusting element for operatively controlling said voltage-control means, a feedback generator driven by said reversible motor and having an output connection for supplying a driving signal to a gun operating mechanism, said feedback generator also having an output connection adapted to be coupled in series with said voltage control output circuit for applying to said rotation-direction-determining circuit and in series with said voltage control output circuit a feedback voltage of such phase as to stabilize simple harmonic motion of said motor about a reference position, a sinusoidal signal generator connectable to said voltage control input circuit, and means for selectively coupling said rotation-direction-determining circuit directly to said voltage control output and the voltage control input to a constant supply voltage or said determining circuit to said voltage control output in series with said feedback generator and said voltage control input to the output of said sinusoidal signal generator whereby said adjusting element for the voltage-control means also operatively controls the amplitude of said simple harmonic motion.

7. A dummy director as defined in claim 6 wherein said voltage-control means includes a variable-turns-ratio transformer.

8. A dummy director adapted to be energized by a reference-voltage source comprising a reversible motor having a rotation-direction-determining input circuit, voltage-control means having an output circuit adapted to be coupled to said rotation-direction-determining input circuit, sinusoidal generating means electrically energized by said reference-voltage source for applying to said voltage-control means a periodically-reversing control voltage having an amplitude which varies sinusoidally with time, prime-mover means for driving said sinusoidal generating means, interchangeable gear means for coupling said prime-mover means to said sinusoidal generating means thereby to determine the period of one cycle of control-voltage amplitude variation, a plurality of signal generators driven by said reversible motor, each of said signal generators having output connections for supplying a signal to a gun operating mechanism, interchangeable gear means for coupling said reversible motor to said signal generators, one of said signal generators also having an output connection adapted to be coupled in series with said voltage control output circuit for applying to said determining circuit and in series with said voltage control output circuit a feedback voltage of such phase as to stabilize simple harmonic motion of said reversible motor about a reference position, and unitary selecting means for coupling said voltage-control means to said reference-voltage source and simultaneously coupling said reversible motor determining circuit directly to said voltage-control means output circuit thereby to cause the director to generate electrical constant-velocity-motion signals or for coupling said voltage-control means to said sinusoidal generating means and said reversible motor determining circuit to said voltage-control means in series with said feedback voltage generating means for causing said director to generate simple-harmonic-motion signals.

ALFRED A. WOLF.

References Cited in the file of this patent
UNITED STATES PATENTS

| Number | Name | Date |
| --- | --- | --- |
| 1,562,917 | Richter | Nov. 24, 1925 |
| 1,713,223 | Green | May 14, 1929 |
| 1,973,279 | Bernarde | Sept. 11, 1934 |
| 2,361,790 | Noxon | Oct. 31, 1944 |
| 2,363,342 | Lesnick | Nov. 21, 1944 |
| 2,389,692 | Sherwin | Nov. 27, 1945 |
| 2,434,259 | Burton | Jan. 13, 1948 |